3,850,865
VINYL POLYMER COATING COMPOSITIONS
Roger Garnier, Lyon, Roger Hogenmuller, Sainte-Foy-les-Lyon, and Jacques Massebeuf, Serezin-du-Rhone, France, assignors to Rhone-Poulenc S.A., Paris, France
No Drawing. Continuation of abandoned application Ser. No. 45,570, June 11, 1970. This application July 24, 1973, Ser. No. 382,074
Int. Cl. C08f 15/16, 45/52
U.S. Cl. 260—28.5 AV                  10 Claims

ABSTRACT OF THE DISCLOSURE

Compositions for coating and glueing comprising:
(a) about 5 to 40% by weight of a vinyl polymer obtainable from monomers, at least 30% of which are vinyl esters of saturated branched aliphatic monocarboxylic acids, the carboxyl groups of which are bonded to tertiary and/or quaternary carbon atoms; and
(b) about 60 to 95% by weight of a mixture of saturated, straight chain, aliphatic hydrocarbons containing 18 to 35 carbon atoms and having a melting point between 34 and 70° C., are described having a low viscosity at temperature not greatly above their melting point.

---

This is a continuation of application Ser. No. 45,570, filed June 11, 1970, now abandoned.

The present invention relates to vinyl polymer compositions which can be used in the fused state for coating or glueing various materials.

Compositions comprising an ethylene-vinyl acetate copolymer and a petroleum paraffin which can be used when hot for coating or glueing materials such as paper have been described in French Pat. No. 1,246,058. Those which contain a considerable proportion of polymer, for example 30 to 40%, possess good adhesion as well as good flexibility. However, they suffer from the disadvantage that they have a high viscosity in the fused state (several hundred centipoises), which results in their having to be heated to high temperatures, of the order of 150° to 200°, in order to be able to use them with customary apparatus for hot melt coating.

We have found, according to the present invention, compositions which can be applied in the fused state and which have a viscosity of 100° of generally less than 200 centipoises. According to the present invention there is provided a composition which comprises:

(a) 5 to 40% by weight of a vinyl polymer obtainable from monomers at least 30% of which consists of vinyl esters of saturated aliphatic monocarboxylic acids, the carboxyl groups of which are bonded to tertiary and/or quaternary carbon atoms; and
(b) 60 to 95% of a mixture of straight-chain saturated aliphatic hydrocarbons containing 18 to 35 carbon atoms and having a melting point between 34 and 70°.

For convenience, the monocarboxylic acids described above will be referred to as "branched acids."

Amongst the branched acids which may be used, very suitable acids are the mixtures of acids obtained by reacting formic acid or carbon monoxide and water with mixtures of olefines containing 4 to 18 carbon atoms, for example dimers or trimers of isobutene or propylene, in the presence of catalysts such as sulphuric or phosphoric acid; the preparation of such acids is described in French Pat. 1,350,937. Particularly valuable acids are those derived from mono-olefines having 8 to 10 carbon atoms. The preparation of the vinyl esters of the branched acids can be effected in accordance with known processes, for example by reacting the branched acids with vinyl acetate in the presence of a mercury salt (see French Pat. 1,350,937).

The monomers which can be copolymerised with the vinyl esters of branched acids include vinyl chloride and vinyl esters of monocarboxylic acids other than of the branched carboxylic acids such as vinyl esters of saturated aliphatic monocarboxylic acids such as vinyl acetate, vinyl propionate, vinyl laurate and vinyl stearate, and vinyl esters of aromatic acids of the benzene series such as vinyl benzoate. However, the polymers used in the compositions of this invention can originate solely from the vinyl esters of branched acids. When they are copolymers with one or more of the monomers described above, the proportion by weight of vinyl esters of branched acids should be greater than 30% by weight based on the total weight of the monomers, preferably greater than 65% by weight.

The preparation of the compositions according to this invention can be effected in various ways. In particular, the polymer can be prepared separately be polymerisation in bulk, emulsion or solution and then mixed with the hydrocarbon, heated to a temperature above its melting point. It is also possible to effect the polymerisation directly in the hot hydrocarbon. In this latter case, it is advantageous to introduce only a part, for example, 10 to 50%, of the total amount of hydrocarbon into the polymerisation mixture, the remainder being added subsequently, for example at the time of use.

The polymerisation reaction, in the presence or absence of the hydrocarbon, can be effected in accordance with customary vinyl polymerisation technique; in particular, an organic peroxide such as lauroyl peroxide, benzoyl peroxide or di-tertiary butyl peroxide, or another peroxidic compound such as isopropyl percarbonate, or a diazo compound such as alpha, alpha-azo-bis-isobutyronitrile, can be used as the catalyst. The amount of catalyst employed can vary within wide limits; an amount of between 0.01 and 1% by weight relative to the monomers is generally suitable. It is generally introduced in batches during the reaction.

It is also possible to bring about the poymerisation by irradiation, for example with ultra-violet light.

If the vinyl polymer is prepared separately, the polymerisation temperature may vary between, for example, 20 and 150°. If the polymerisation takes place in the presence of the hydrocarbon, the temperature can vary between, for example, 34 to 70° and 150°.

The compositions according to the invention can consist solely of the mixture of the vinyl polymer and the hydrocarbon. They can also contain fillers, colouring pigments and various other additives, in particular thermoplastic resins, such as ethylene-vinyl acetate copolymers and so-called "reinforcing" resins, the use of which is well known in the field of compositions which can be applied in the fused state; amongst the reinforcing resins, which generally have a melting point below 100° C., esters of colophony, para-toluenesulphonamideformaldehyde resins, phenol-formaldehyde resins, indene-coumarone resins, phenolic resins and terpene resins may be quoted. These resins can contain a plasticiser.

The compositions according to this invention can be used in a conventional manner for coating or glueing, for example in an apparatus consisting of a heated vessel, in which the composition is kept in the liquid state, and a system which allows a regulated amount of the composition to be deposited on the support.

These compositions can be used in the most diverse fields, for example for coating paper, cardboard, textiles, and plastic films and sheets, especially for the manufacture of packagings to which the coatings of the invention impart, amongst other properties, impermeability, flexibility, and rub resistance, in particular if the support consists of paper or cardboard; for book binding, glueing shoe soles, manufacture of laminates, veneering in the furniture industry, and glueing plastics to metal supports in the automobile industry.

As a result of their low viscosity in the fused state (generally less than 200 cp. at 100°) the compositions can be employed at a temperature close to their cloud point, that is to say below 100° C. This results, on the one hand, in a considerable power saving and, on the other, in the possibility of applying the compositions to materials which do not withstand high temperatures.

By way of illustration, compositions containing 5 to 10% by weight of polymer will generally be employed as coatings which do not require high mechanical properties, such as the coating of paper or cardboard. For the manufacture of packagings, it will be more advantageous to use compositions containing 10 to 20% by weight of polymer.

The following Examples further illustrate the present invention. A product sold commercially under the tradename "Versatate Veova 911" is used, this being a mixture of vinyl esters of branched $C_9$ to $C_{11}$ monocarboxylic acids. This product has the following characteristics:

Average molecular weight _____ 197
Viscosity at 20° C., cst. _____ 2.2
Refractive index $n_D^{20}$ _____ 1.439
Acid number _____ 1
Bromine number _____ 78–80
Boiling point (100 mm. Hg), ° C. _____ 129–180

The hydrocarbon used has a melting point of 54–56° C; it is hereafter called "paraffin."

EXAMPLE 1

400 g. of "Versatate Veova 911" and 400 g. of paraffin were introduced into a 3 litre glass reactor equipped with a stirrer and a thermometer. The mixture was heated on a waterbath until a temperature of 75° C. inside the reactor was reached. A transparent and perfectly homogeneous fluid mixture was obtained. The air was then displaced by nitrogen and 0.4 g. of azobisisobutyronitrile was introduced. Throughout the polymerisation a temperature of 75° C., and a slow stream of nitrogen, were maintained.

After 4 hours, a further 0.8 g. of azobisisobutyronitrile was introduced. After 20 hours, when the reaction no longer progressed, the unreacted "Versatate Veova 911" was distilled under a pressure of 2 mm. of mercury, the temperature being 75° C. throughout.

After cooling, a product was obtained which was solid at ordinary temperature but which on heating to 60° C. melted to give a liquid, colourless and perfectly transparent mass.

Determination of the volatile matter shows that 85% of the "Versatate Veova 911" had polymerised.

The composition contained 340 g. of polymer and 400 g. of paraffin. 400 g. of paraffin were added to this mixture so as to obtain a composition containing 30% by weight of polymer and 70% by weight of paraffin. This composition had the following characteristics:

Cloud point, ° C. _____ 55–56
Viscosity at 100° C., cp. _____ 50

The cloud point was determined by turbidimetric measurement, the speed of cooling being 1° per minute and the starting temperature 150° C.

By way of comparison, a composition containing 70% by weight of paraffin and 30% by weight of an ethylene-vinyl acetate copolymer containing 28% by weight of vinyl acetate, having a melt index of 150, had a viscosity of 800 cp. at 100°. Replacement of the copolymer of melt index 150 by a copolymer of melt index 3 caused the viscosity at 100° to increase to 6500 cp.

EXAMPLE 2

512 g. of "Versatate Veova 911" and 128 g. of vinyl acetate were copolymerised in the presence of 160 g. of paraffin in a similar manner to that described in Example 1. 0.2 g. of azo-bisisobutyronitrile was used at the start of the polymerisation, and 0.6 g. was introduced during the polymerisation. The reaction lasted 22 hours.

A product which was solid at ordinary temperature and which melted at 65° C. to give a fluid and limpid mass was obtained. The polmer obtained contained (by weight) 80% of "Versatate Veova 911" and 20% of vinyl acetate.

The resulting composition (760 g.) contained by weight) 21% of paraffin and 79% of polymer (degree of monomer conversion: 95%).

1260 g. of paraffin were added so as to obtain a composition containing 30% by weight of polymer and 70% by weight of paraffin. This composition had the following characteristics:

Cloud point, ° C. _____ 88–89
Viscosity at 100° C., cp. _____ 20

EXAMPLE 3

A copolymer was prepared in the same way as in Example 1 from 448 g. of "Versatate Veova 911," 192 g. of vinyl propionate, 240 g. of paraffin and 0.4 g. of azobisisobutyronitrile. The reaction lasted 24 hours.

The product was solid at ordinary temperature and, on heating to 85° C. yielded a limpid liquid. The copolymer contained 70% of "Versatate Veova 911" and 30% of vinyl propionate. The degree of conversion was 97%.

The composition (855 g.) contained 72% by weight of polymer and 28% by weight of paraffin. 1200 g. of paraffin were added thereto so as to yield a composition containing 30% by weight of polymer and 70% by weight of paraffin.

This composition had the following characteristics:

Cloud point, ° C. _____ 84–85
Viscosity at 100° C., cp. _____ 40

We claim:
1. A coating composition which comprises:
   (a) about 5 to 40% by weight of a vinyl polymer obtained by polymerisation of monomers, at least 65% by weight of which are vinyl esters of saturated branched aliphatic monocarboxylic acids having from 9 to 11 carbon atoms, the carboxyl groups of which are bonded to tertiary and/or quaternary carbon atoms and from 0 to 35% by weight of which is vinyl chloride, a vinyl ester of a saturated aliphatic straight chain monocarboxylic acid or a vinyl ester of an aromatic acid of the benzene series; and
   (b) about 60 to 95% by weight of a mixture of saturated, straight chain, aliphatic hydrocarbons containing 18 to 35 carbon atoms and having a melting point between 34 and 70° C.
2. A composition according to claim 1, in which the vinyl polymer is also derived from at least one of vinyl acetate, vinyl propionate, vinyl laurate, vinyl stearate or vinyl benzoate.
3. A composition according to claim 1, in which the hydrocarbon is a petroleum paraffin.
4. A composition according to claim 1 which also contains a filler or coloured pigment.
5. A composition according to claim 1, which also contains a thermoplastic resin.
6. A composition according to claim 5, in which the thermoplastic resin is an ethylene-vinyl acetate copolymer or a reinforcing resin.

7. A composition according to claim 6, in which the reinforcing resin is an ester of colophony, or a *para*-toluenesulphonamide/formaldehyde, phenol/formaldehyde, indene/coumarone, phenolic or terpene resin.

8. A method of coating or bonding materials which comprises applying to the surfaces to be coated or bonded a composition as claimed in claim 1 heated to above its melting point.

9. A method according to claim 8, wherein the material is paper or cardboard.

10. A hot melt adhesive having the composition of claim 1.

References Cited
UNITED STATES PATENTS

| | | | |
|---|---|---|---|
| 3,519,587 | 7/1970 | Wiest et al. | 260—285 |
| 3,654,213 | 4/1972 | Christenson et al. | 260—86.1 E |

MORRIS LIEBMAN, Primary Examiner

S. L. FOX, Assistant Examiner

U.S. Cl. X.R.

260—86.1 E; 117—155 UA, 158

UNITED STATES PATENT OFFICE
CERTIFICATE OF CORRECTION

Patent No. 3,850,865  Dated November 26, 1974

Inventor(s) ROGER GARNIER et al

It is certified that error appears in the above-identified patent and that said Letters Patent are hereby corrected as shown below:

In the heading above column 1, please read:

--claims priority, application France, June 13, 1969, No. 69/19787--.

Signed and sealed this 29th day of April 1975.

(SEAL)
Attest:

RUTH C. MASON
Attesting Officer

C. MARSHALL DANN
Commissioner of Patents
and Trademarks